Figure 1:
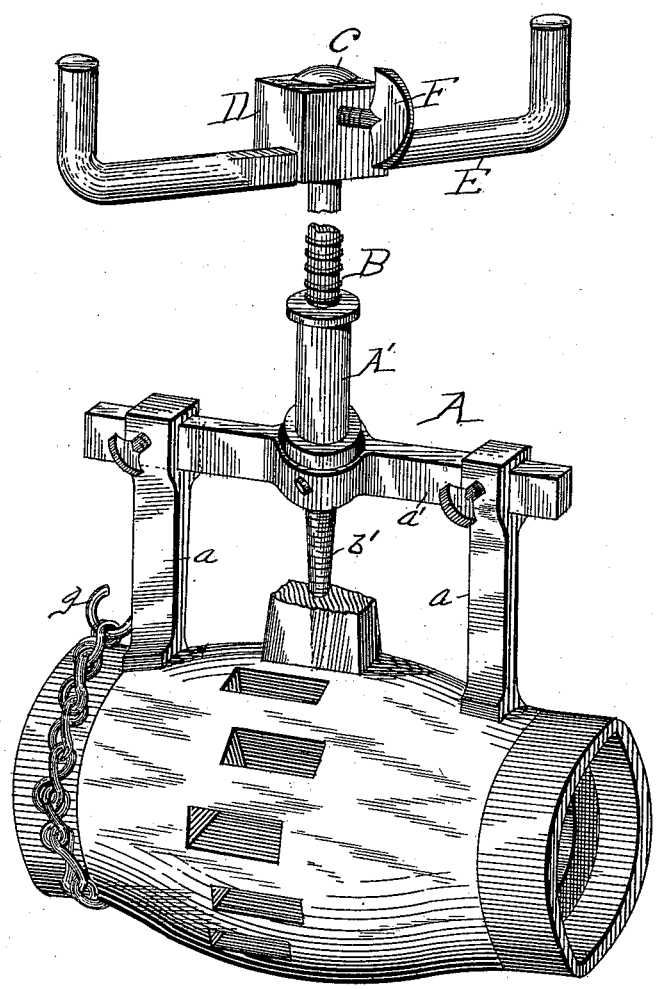

(No Model.)  2 Sheets—Sheet 1.

R. CAMERON.
BUNG AND TENON EXTRACTOR.

No. 507,611. Patented Oct. 31, 1893.

WITNESSES
Thos. J. Ract. Jr.
Jas. O'Neale

Robert Cameron
INVENTOR
By A. S. Evans & Co.
Attorneys

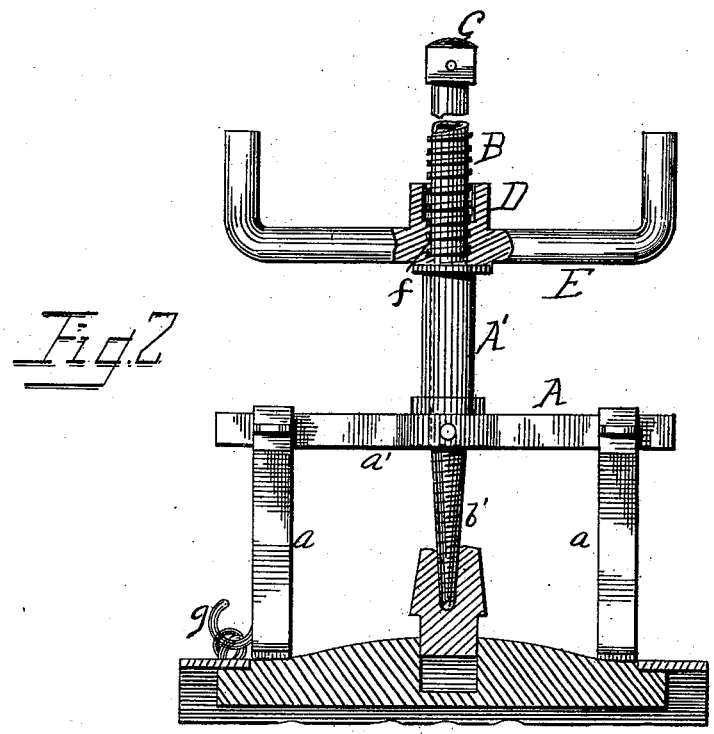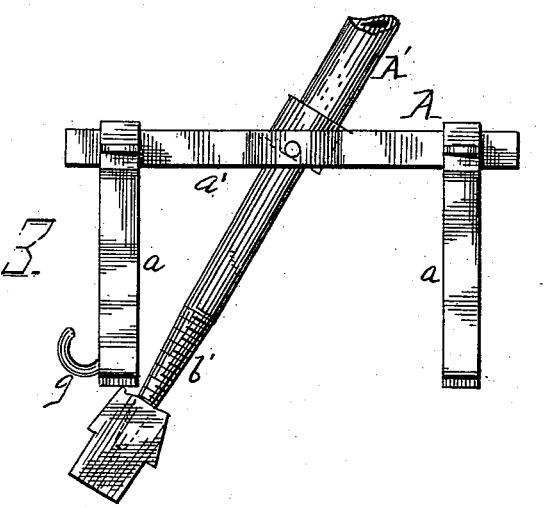

UNITED STATES PATENT OFFICE.

ROBERT CAMERON, OF BERNALILLO, TERRITORY OF NEW MEXICO.

BUNG OR TENON EXTRACTOR.

SPECIFICATION forming part of Letters Patent No. 507,611, dated October 31, 1893.

Application filed May 17, 1893. Serial No. 474,582. (No model.)

*To all whom it may concern:*

Be it known that I, ROBERT CAMERON, a citizen of the United States, residing at Bernalillo, in the county of Bernalillo and Territory of New Mexico, have invented certain new and useful Improvements in Bung or Tenon Extractors, of which the following is a full, clear, and exact description, reference being had to the accompanying drawings, forming a part of this specification, in which—

Figure 1, represents my device in perspective and its application in practice. Fig. 2, is a side elevation of the same, showing the tenon partially withdrawn from the socket in the hub. Fig. 3, is a view showing the device in the act of disengaging the tenon from the screw point.

My invention relates to devices adapted to be applied to the hubs of vehicles for the purpose of withdrawing the tenon of broken spokes, and also for the extracting of bungs out of barrels; and my present invention consists of the construction and combination of the several devices which I shall hereinafter fully describe and claim.

To enable others skilled in the art to which my present invention appertains I will proceed to describe the exact manner in which I have carried it out.

In the said drawings A represents a yoke-shaped frame having laterally adjustable leg portions $a\ a$, adapted to be supported upon the hub as shown, said yoke having a tubular extension or thimble A' rising from the center of its cross bar $a'$ and pivoted to swing laterally and adapted to receive and form a bearing for the operating screw B. This screw is double threaded, that is its lower portion $b'$ is tapered and threaded and adapted to be screwed into the broken end of the tenon or into the bung as may be desired. The extreme upper end of the screw B, is formed with, or carries a head C to which the socketed nut or head D on the operating hand lever E is fitted, and then rigidly secured by means of a set screw or nut F, said nut being interiorly threaded at $f$, to engage the feed screw portion as hereinafter explained.

One of the legs of the yoke A is formed or provided with a hook $g$, or analogous device, into engagement with which one end or portion of a chain is fitted, while the other or free end or portion of the chain is then passed around the end of the hub, as shown and thence returned and attached to the hook.

The operation of my device is substantially as follows: With a small auger a hole is first bored into the end of the broken spoke of a wheel, or bung of a barrel, which you desire to extract, and then the yoke A is placed on the hub or barrel with its legs on each side of the bung or tenon to be withdrawn. The chain is now passed around the end of the hub or barrel and then attached to the hook $g$. The operating lever secured to the upper end of the screw, it is evident that, when the same is turned, the lower tapered end of the screw enters the hole made by the auger and is screwed into the bung or tenon the desired distance. The operating lever is now released from contact with the head of the screw, and its threaded nut portion $f$, engages the upper or feed portion of the screw and is run down on the same until its progress is arrested by the under side striking the top of the tubular extension or thimble A'. The further movement of the lever causes the under side of the same to fulcrum upon the top of said extension and feed the screw upward thereby withdrawing the tenon from its socket in the hub or the bung from the hole in the barrel. After the bung or tenon has been extracted the screw is canted to one side to bring the upper end of the tenon under one of the legs and a further rotation of the screw frees the tenon.

Having thus described my invention, what I claim as new, and desire to secure by Letters Patent of the United States, is—

1. In a tenon extractor, the combination of a yoke or frame, of a pivoted thimble mounted in said yoke and a screw having at its lower end an entering screw, at its upper end a head and between the head and the screw a smooth portion, and a lever having a socketed nut, substantially as herein described.

2. In a tenon extractor, the combination with a yoke or frame, the legs of which are laterally adjustable, of a pivoted thimble mounted in said yoke, and a screw having at its lower end an entering point, at its upper end a head and between the head and the screw a smooth portion, and a lever having a socketed nut, substantially as herein described.

ROBERT CAMERON.

Witnesses:
J. EDWARD PRIEST,
J. D. MAY.